use  US008911688B2

(12) United States Patent
Gransee et al.

(10) Patent No.: US 8,911,688 B2
(45) Date of Patent: Dec. 16, 2014

(54) MICROVALVE AND SEALING DEVICE FOR USE IN A MICROFLUIDICS SYSTEM, AND METHOD FOR THE PRODUCTION THEREOF

(75) Inventors: Rainer Gransee, Mainz (DE); Eva Schaeffer, Mainz (DE); Klaus-Stefan Drese, Mainz (DE); Silvio Kraus, Nordhausen/OT Hesserode (DE); Tobias Baier, Darmstadt (DE); Felix Schmitz, Mainz (DE)

(73) Assignee: Fraunhofer-Gesellschaft zur Förderung der Angewandten Forschung E.V., München (DE)

( * ) Notice: Subject to any disclaimer, the term of this patent is extended or adjusted under 35 U.S.C. 154(b) by 0 days.

(21) Appl. No.: 12/737,278

(22) PCT Filed: Jun. 19, 2009

(86) PCT No.: PCT/EP2009/004455
§ 371 (c)(1),
(2), (4) Date: Dec. 23, 2010

(87) PCT Pub. No.: WO2009/156102
PCT Pub. Date: Dec. 30, 2009

(65) Prior Publication Data
US 2011/0104024 A1    May 5, 2011

(30) Foreign Application Priority Data
Jun. 26, 2008  (DE) .......................... 10 2008 002 675

(51) Int. Cl.
*F01L 7/06* (2006.01)
*B01L 99/00* (2010.01)
(Continued)

(52) U.S. Cl.
CPC ....... *F16K 99/0001* (2013.01); *B01L 3/502738* (2013.01); *F16K 99/0013* (2013.01); *B01L 2200/0689* (2013.01); *B01L 2300/0816* (2013.01); *B01L 2400/0622* (2013.01); *B01L 2400/0644* (2013.01); *F16K 2099/0084* (2013.01)

USPC .......... 422/537; 422/68.1; 422/243; 422/502; 422/504; 422/544; 435/283.1; 435/288.5; 277/312; 277/628; 29/890.12; 251/149.2; 251/149.5; 251/160; 251/161; 251/163; 251/170; 251/192; 251/314; 251/337

(58) Field of Classification Search
None
See application file for complete search history.

(56) References Cited

U.S. PATENT DOCUMENTS 4,428,511 A * 1/1984 Howell .......................... 222/309
6,748,975 B2   6/2004 Hartshorne et al.
(Continued)

FOREIGN PATENT DOCUMENTS

DE   199 48 613 A1   4/2001
DE   102 27 593 A1   2/2003
(Continued)

OTHER PUBLICATIONS

Hasegawa, et al., Multi-Directional Micro-Switching Valve Chip with Rotary Mechanism, ScienceDirect, Sensors and Actuators A 143, 2008, pp. 390-398, Elsevier B.V.

(Continued)

*Primary Examiner* — Jill Warden
*Assistant Examiner* — Timothy G Kingan
(74) *Attorney, Agent, or Firm* — Hudak, Shunk & Farine Co. LPA

(57) ABSTRACT

A microvalve for controlling fluid flows, and a sealing device for sealing cavities in a microfluidic system, particularly in a lab-on-a-chip system, and a method for the production thereof. A sealing surface of a valve body, or a sealing element, respectively, rests on a sealing surface of a substrate and is pressed against the sealing surface of the substrate in a fluid-tight manner by means of a clamping element. The clamping element and/or the valve body, or the sealing element, respectively, are at least partially elastic.

11 Claims, 6 Drawing Sheets

(51) Int. Cl.
  *B23P 11/00* (2006.01)
  *F16J 15/02* (2006.01)
  *F16K 99/00* (2006.01)
  *B01L 3/00* (2006.01)

(56) References Cited

U.S. PATENT DOCUMENTS

| | | |
|---|---|---|
| 2003/0152489 A1 | 8/2003 | Gueller et al. |
| 2005/0183957 A1* | 8/2005 | Desmond et al. ............ 204/600 |
| 2006/0054849 A1* | 3/2006 | Brennen .................. 251/129.11 |
| 2007/0025887 A1* | 2/2007 | Baeuerle et al. ............. 422/104 |
| 2007/0144594 A1 | 6/2007 | Moon et al. |
| 2009/0321356 A1* | 12/2009 | Gerhardt et al. ............. 210/656 |

FOREIGN PATENT DOCUMENTS

| | | |
|---|---|---|
| EP | 1 350 759 A2 | 10/2003 |
| WO | 01 86155 A1 | 11/2001 |
| WO | 2008 053751 A1 | 5/2008 |

OTHER PUBLICATIONS

Hasegawa, et al., 10-Way Micro Switching Valve Chip for Multi-Directional Flow Control, 7th International Conference on Miniaturized Chemical and Biochemical Analysis Systems, Oct. 5-9, 2003, Squaw Valley, CA, USA pp. 215-218.

Schaeffer et al., Rotating Valves Allowing Bubble-free Metering and Mixing, MipTec, 9th International Conference & Exhibition on Drug Discovery, May 9, 2006.

* cited by examiner

Fig. 1 (STATE OF THE ART)

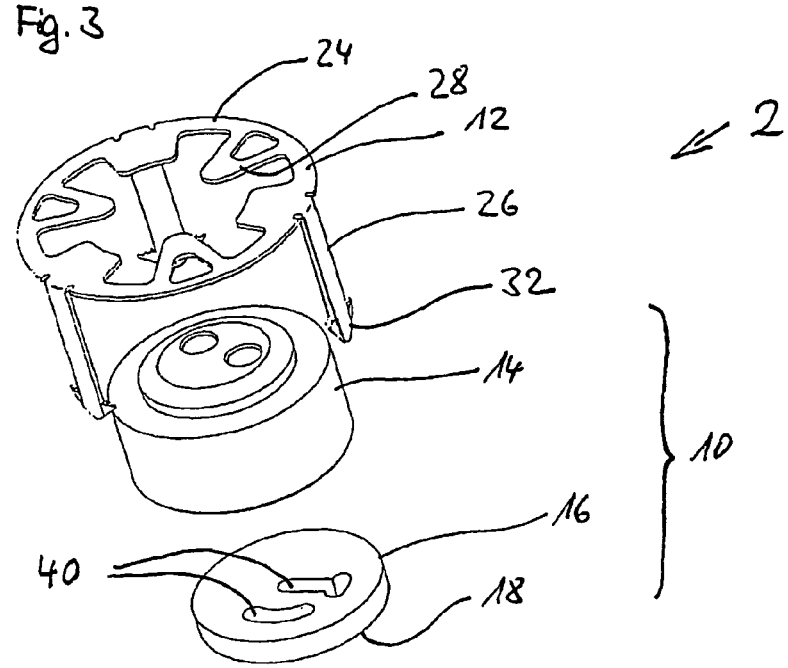
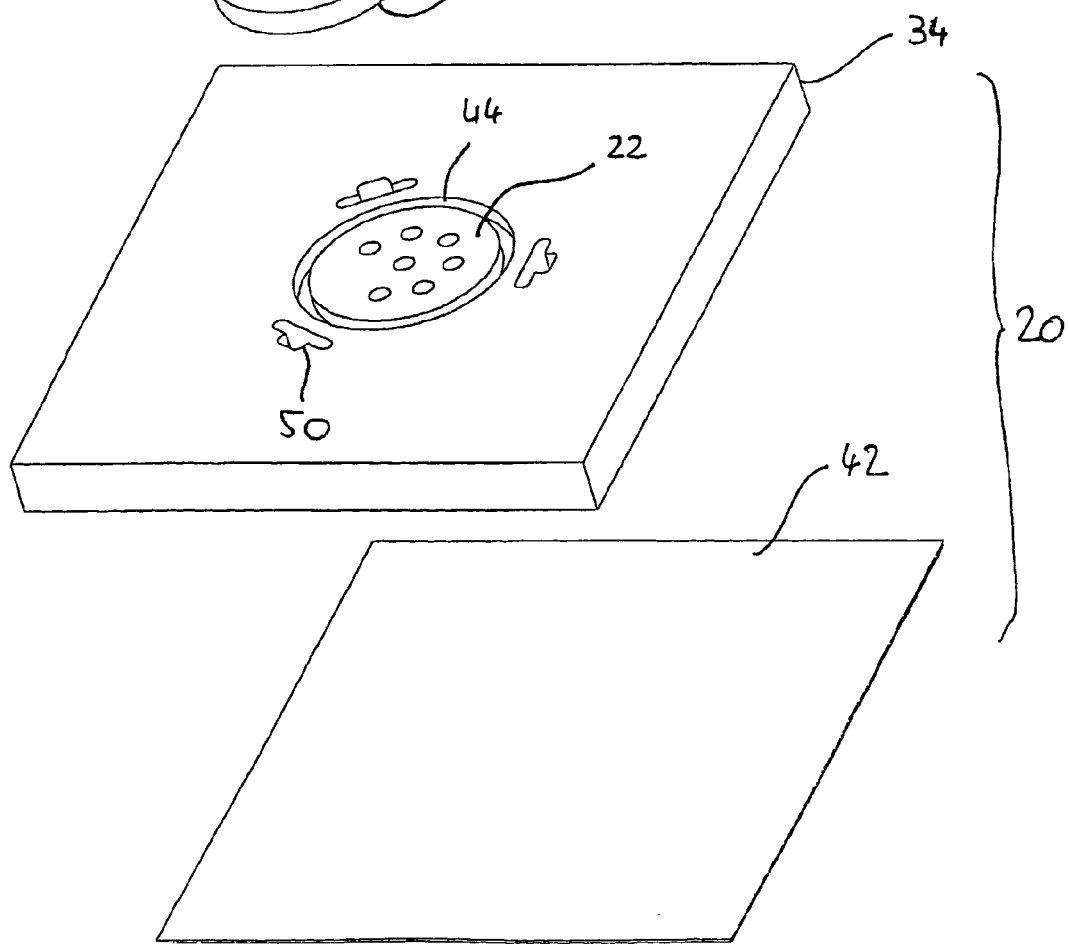

MICROVALVE AND SEALING DEVICE FOR USE IN A MICROFLUIDICS SYSTEM, AND METHOD FOR THE PRODUCTION THEREOF

FIELD OF INVENTION

The invention concerns a microvalve for control of fluid streams and a sealing device for the sealing of cavities in a microfluidics system, especially in a lab-on-a-chip system as well as a method for its production. The microvalve has a substrate with a sealing surface and a valve body disposed movably relative to the substrate, which has a sealing surface and defines at least one channel for optional connection and/or separation of fluid lines in the substrate, wherein the sealing surface of the valve body and the sealing surface of the substrate lie against each other in a fluid-tight manner. The sealing device has a substrate with a sealing surface and a sealing element, having a sealing surface for sealing off a cavity in the substrate. The invention further relates to a sample processing chip with such a microvalve and/or such a sealing device.

A sample processing chip in the sense of this invention is a microfluidic system for chemical and biochemical analysis and/or synthesis, for example, for so-called point-of-care applications. These microfluidic systems are also termed lab-on-a-chip.

By sealing element in the sense of this invention is generally meant a nonpermeable element sealing off the cavity (channel, reservoir, chamber) from the surroundings of the substrate, or at least selectively sealing it off, e.g., for selected substances, especially a septum, a membrane, a filter element or the like. The sealing element can thus take on other functions in addition to the (selective) sealing function. For example, it can be air or gas-permeable for venting of the cavity. In contrast with the valve body, which given its function is movable relative to the substrate, the sealing element can be connected immovably to the substrate.

BACKGROUND OF THE INVENTION

Microvalves of the kind mentioned above are known. For example, reference is made to the patent application laid open DE 102 27 593 A1, the U.S. Pat. No. 6,748,975 B2 and the article "10-Way micro switching valve chip for multi-directional flow control", Tadahiro Hasegawa et al, 7th International Conference on Miniaturized Chemical and Biochemical Analysis Systems, 5-9 Oct. 2003, Squaw Valley, Calif. USA.

From DE 102 27 593 A1, for example, there is known a microvalve, which has a substrate and a cover plate as valve body, which have contact surfaces lying against each other in fluid-tight contact and can be positioned relative to each other so that fluid lines can be optionally connected or separated. The microvalve is disclosed as being either a rotary valve with a cylindrical cover plate or a slide valve with a rectangular cover plate. Polymer materials and optionally composite materials are proposed preferably as the substrate and cover plate material.

The present invention deals with the question of how to create a simple and functionally reliable connection of the valve body and the sealing element to the substrate, as in such microvalves. Since the aforementioned microfluidics systems and especially the lab-on-a-chip systems are generally designed for onetime use, a low-cost solution is desirable. DE 102 27 593 A1 offers no clues for this.

In U.S. Pat. No. 6,748,975 B2 is disclosed a rotary valve, which is formed by a valve body (or rotor) which can turn relative to the substrate (or stator). The rotor can turn between two or more valve positions, in which one or more channels in the rotor optionally connects one or more inlet openings with one or more outlet openings, or separates these. The rotor lies by one contact surface on a corresponding contact surface of the stator. The position of the rotor with respect to the stator is defined by inserting the two elements in a valve housing, which besides the rotor and the stator includes various means for pressing on and activating the valve. Even though the rotor and the stator are loose parts in this case and seem suitable for onetime use, still a considerable expense is required to assembly the functional valve and thus the manipulation of the valve become more difficult.

A rotary valve consisting of a substrate and a rotating valve body is also pointed out in the aforementioned article by Hasegawa et al., which lie against each other by their contact surfaces. The valve body is formed from a silicone rubber ring with channels worked into it, which is pressed against the substrate by means of a mechanism consisting of at least four parts, including a pressing spring. Just how the pressing spring is buttressed against the substrate is not evident from the article. Here as well, it is to be assumed that an enclosing valve housing is provided, which receives the valve arrangement.

The inventor itself has already presented microvalve arrangements with a substrate 210 and a valve body 212 of the aforementioned kind at the conference "MipTec—The 9th International Conference and Exhibition on Drug Discovery" on 9 May 2006, as described hereafter by means of FIG. 1. The valve body 212 is in the form of an elastomer seal and is pressed by its contact or sealing surface 214 against a corresponding contact or sealing surface 216 of the substrate 210 via a valve cylinder 218. The valve cylinder 218 is fashioned in the form of a plunger and has a pressing force applied to it by means of a compression spring 220. The compression spring 220 in turn thrusts against a housing 222, which is screwed directly onto the substrate 210 by means of a screw connection 224. The microvalve arrangement of FIG. 1 is of simple construction when compared to the aforesaid prior art, yet still a multitude of different materials and components are needed and the onetime assembly is still too elaborate in practice for a mass production.

SUMMARY OF THE INVENTION

The problem of the present invention, accordingly, is to improve a microvalve as well as a sealing device of the aforementioned kind so that it can be produced with low effort and thus with low costs. Accordingly, the problem of the invention is to provide a method for the production of such a microvalve or a corresponding cover device that is more economical and thus suited for the mass production of disposable products.

The problem is solved by a microvalve for control of fluid streams in a microfluidics system, especially in a lab-on-a-chip system, with a substrate, having a sealing surface, and a valve body disposed movably relative to the substrate, which has a sealing surface and defines at least one channel for optional connection and/or separation of fluid lines in the substrate, wherein the sealing surface of the valve body and the sealing surface of the substrate lie against each other in a fluid-tight manner, wherein the valve body is pressed by its sealing surface against the sealing surface of the substrate by means of a clamping element connected to the substrate in form-fitting manner and the clamping element and/or the valve body is at least partly elastic, a sealing device for sealing of cavities in a microfluidics system, especially in a lab-on-a-chip system, with a substrate, having a sealing surface, and a sealing element, having a sealing surface for sealing a cavity in the substrate, wherein the sealing element is pressed by its sealing surface against the sealing surface of the substrate by means of a clamping element connected in form-fitting manner to the substrate and the clamping element and/or the sealing element is at least partially elastic, as well as a method for production of a microvalve or a sealing device in a microfluidics system, especially in a lab-on-a-chip system, wherein a valve body or a sealing element with a sealing surface is placed on a sealing surface of a substrate, the valve body or the sealing element is pressed by means of a clamping element by its sealing surface fluid-tight against the sealing surface of the substrate, and the clamping element is connected by form-fit to the substrate. Advantageous modifications of the invention are the subject of the subclaims.

In the microvalve according to the invention, the valve body is pressed by its sealing surface against the sealing surface of the substrate by means of a clamping element connected to the substrate in form-fitting manner and the clamping element and/or the valve body is at least partly elastic.

The inventors have discovered that the construction of the microvalve according to the invention is likewise suitable for simple and economically favorable assembly of other sealing elements with sealing function. In a sealing device according to the invention for the sealing of cavities with a sealing element of the kind described above, the sealing element is pressed by its sealing surface against the sealing surface of the substrate by means of a clamping element connected in form-fitting manner with the substrate, while the clamping element and/or the sealing element are at least partially elastic.

The method according to the invention for production of the microvalve or the sealing device in a microfluidics system, especially in a lab-on-a-chip system, calls for placing a valve body or a sealing element with a sealing surface on a sealing surface of a substrate and connecting a clamping element in form-fitting manner to the substrate, wherein the clamping element presses the valve body or the sealing element by its sealing surface fluid-tight against the sealing surface of the substrate.

While thus far the only valve arrangements known are those assembled from at least six individual parts and needing to be assembled in a corresponding number of individual steps, only three parts are provided for the microvalve of the invention or for the sealing device of the invention, namely, the substrate, the valve body and the clamping element. These three elements are put together in a simple work step, in which they are stacked one on the other and fixed by form fitting between the clamping element and the substrate. Here, the clamping element and/or the valve body or the sealing element functionally replace the spring. The clamping element, which supports the valve body or the sealing element relative to the substrate on its side away from the sealing surface, also functionally replaces the much more complicated to fabricate housing. The clamping element can be made as a simple injection molded, metal or stamped part (e.g., from spring plate) or a combination of the two, a plastic extrusion-coated stamped part. The valve body can also be made as a simple part, such as a disk-shaped part, in one or at least a few work steps. The microvalve of the invention and the sealing device of the invention totally do without the use of a spring to generate the pressing force. For this purpose, the invention makes use of the (partial) elasticity of the valve body or sealing element and/or the clamping element. For this there needs to be a suitable choice of material for the valve body or the sealing element and/or the clamping element, taking into account the geometry of the particular structural part, so that a sufficient elasticity and, thus, pressing force is assured for the sealing.

In one advantageous modification, the valve body or the sealing element is compressive-elastic. Alternatively or additionally, the clamping element is flexural-elastic, at least for a segment.

The former can be achieved preferentially in that the valve body or the sealing element consists at least partly of an elastomer. Especially suitable materials are thermoplastic elastomers, silicones, fluoroelastomers such as Viton®, ethylene-propylene-diene rubber, styrene-butadiene rubber (SBR), ethylene-propylene rubber (EPM) or nitrile rubber.

The latter can be achieved preferentially in that the clamping element consists of spring steel, an injection-molded partly elastic plastic, or a plastic extrusion-coated spring steel. Specially suitable plastics are thermoplasts and duroplasts, especially acrylonitrile-butadiene-styrene copolymerizate (ABS), polyoxymethylene (POM), polyether ketones (PEEK).

In one preferred modification of the invented microvalve or the invented sealing device, the clamping element and the substrate engage with each other by means of a snap connection.

The snap connection is preferably provided by a locking pawl or a snap hook formed on the clamping element, which locks into a corresponding opening in the substrate. However, the flexural elasticity of the clamping element can be utilized for this.

Especially preferably, the valve body has a shape-stable part and an elastomer seal, on which the sealing surface is formed, whereby a pressing force from the pressing ring acts across the shape-stable part on the elastomer seal.

The shape-stable part ensures a uniform distribution of the pressing force over the entire sealing surface of the elastomer seal, while the latter due to its elasticity is compressed and provides a sufficient sealing.

In one advantageous modification, the shape-stable part together with the elastomer seal is produced by two-component injection molding.

In this way, the shape-stable part, which in this embodiment preferably consists of a shape-stable plastic, and the elastomer seal are combined into a single valve body, which reduces the assembly expense. Also, the production of a two-component injection-molded part is relatively economical.

Advantageously, the at least one channel in the elastomer seal is formed as a through opening.

This embodiment of the invention has the advantage of easy workmanship. Channels in the form of depressions or grooves, if the valve body is not finished by injection molding, are produced or added subsequently in familiar fashion by etching, laser ablation, spray engraving, hot engraving, milling or the like. On the other hand, the channel in the form of a through opening can be produced in a single stamping process and a valve body with such an elastomer seal is therefore more favorable.

The microvalve can preferably be fashioned as a rotary valve or a slide valve.

In an especially preferred embodiment of the microvalve or the sealing device, the sample processing chip forms the substrate.

The microvalve or the sealing device on account of their makeup are easy to miniaturize. The functional components of valve and/or sealing device can therefore be arranged with higher density on the microfluidic chip. It is also possible to use both sides of a chip for mounting. In this way, even higher integration densities and more complex channel structures and thus an improved functionality can be achieved for the same footprint on a chip.

The microvalve or sealing device of the invention, especially when combined with a recessed seat, can be integrated almost fully in the sample processing chip when the valve seat or the seat for the sealing element is worked so deep in the form of a recess into the sample processing chip that the valve body can be set fully in the processing chip. Moreover, the clamping element can also be integrated in the sample processing chip, at least partly, by suitable depressions or recesses in it. In this way, the integration density of the functional components is further increased and the chip is given a flat profile, even when the functional components of valve and/or sealing device are mounted on both sides.

BRIEF DESCRIPTION OF THE DRAWINGS

Further problems, features and benefits of the invention will now be explained more closely by means of sample embodiments with the help of the drawings. These show:

FIG. 3, the sample processing chip with microvalve per FIG. 2 in exploded view;

DETAILED DESCRIPTION OF THE INVENTION

Figure 1:
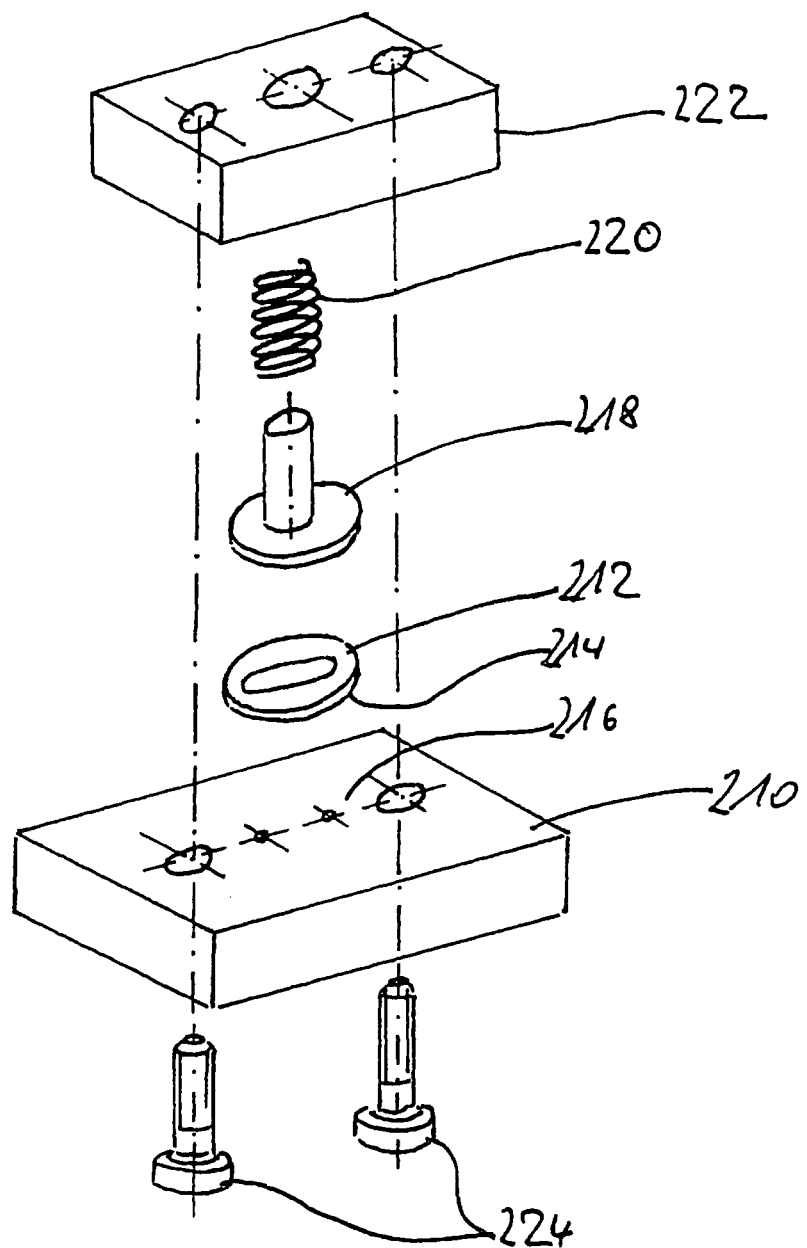
FIG. 1, a microvalve of familiar design.
Figure 2:
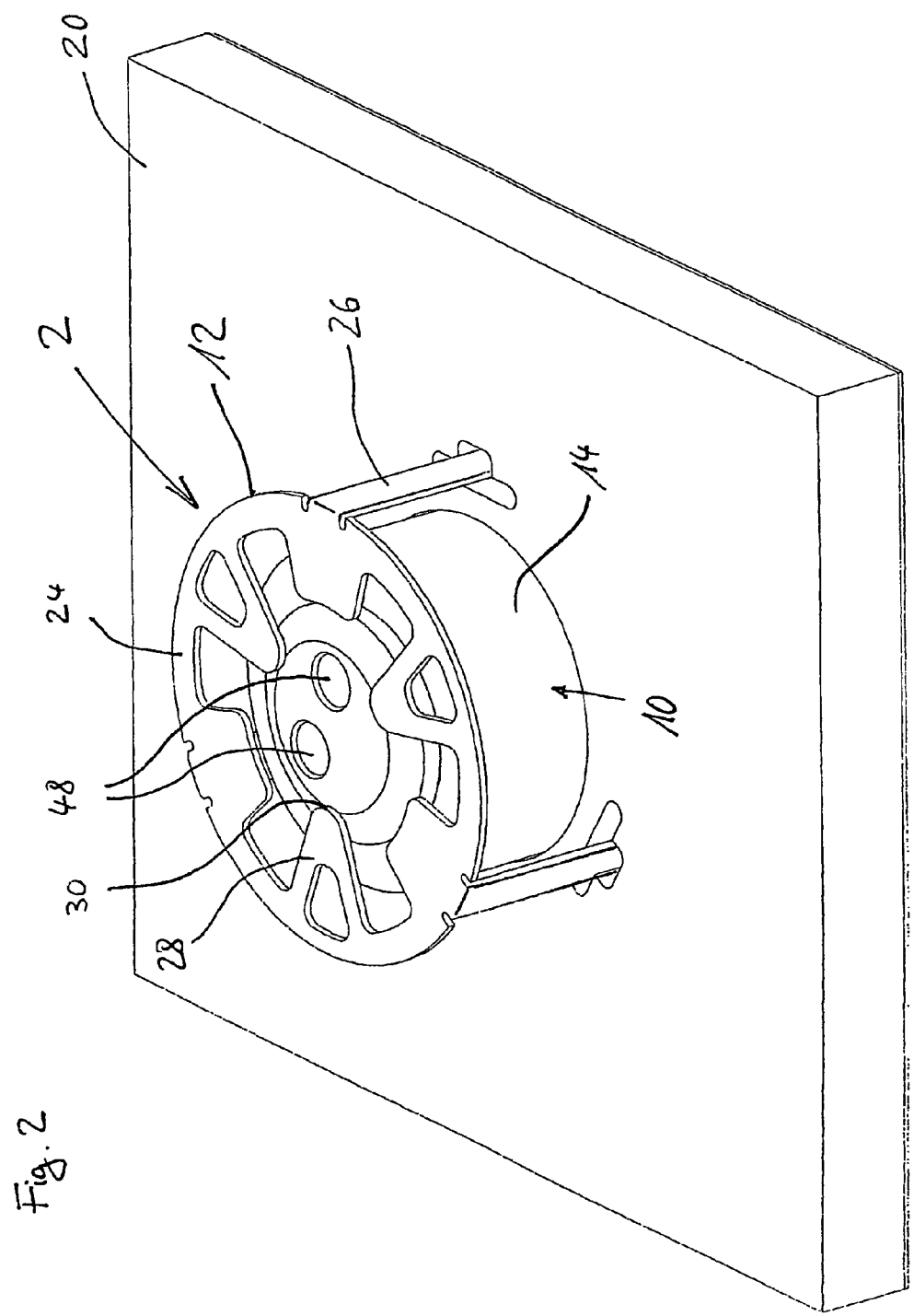
FIG. 2, a perspective view of a first embodiment of the invented microvalve on a sample processing chip.

A first embodiment of the microvalve of the invention with sample processing chip is shown in perspective view from various directions and partly sectioned in FIGS. 2 to 5, to which we shall refer in what follows.

The microvalve is designed as a rotary valve 2 and has an essentially cylindrical valve body 10 and a clamping element 12 that supports it. The valve body 10 consists of a shape-stable part 14 and an elastomer seal 16, on whose bottom side a sealing surface 18 is formed. The valve 2 is arranged in the manner described hereafter on a substrate in the form of a sample processing chip 20 and secured. By its sealing surface 18, the valve lies on a corresponding sealing surface 22 of the substrate 20.

The clamping element 12 in this embodiment is stamped out from a plate of spring steel and bent into the three-dimensional shape depicted. The clamping element 12 has an annular segment 24 for pressing on the valve body 10 and three downward bent anchor elements 26, each with an arrow-shaped pawl 32 at its lower end for form-fitting connection to the sample processing chip 20. From the annular segment 24, three bending elements 28 emerge radially inwards and rest against the top side of the shape-stable part 14 of the valve body 10. The height of the anchor elements 26 is designed as a function of the height of the valve body 10 so that the bending elements 28 are tensioned in desired degree and press the valve body 10 against the substrate 20 when the valve is mounted on the substrate 20. The bending elements 28 have the shape of triangular brackets that pass into the annular segment 24 on one side and by their opposite corner 30, pointing radially inwards, rest against the shape-stable part 14 of the valve body 10. By a small contact surface between the bending elements 28 and the shape-stable part 14 the rotating of the valve body 10 is opposed by only a slight frictional force in this place when the rotary valve is activated. The spring force by which the bending elements 28 press the valve body 10 against the substrate 20 is determined, for a given basic material (spring steel plate) by the geometry of the clamping element 12. It is designed so that the pressure ensures a seal for the least possible frictional resistance. One must take into account the coefficient of friction between the sealing surface 18 of the elastomer seal 16 and the sealing surface 22 of the substrate 20, as well as the size of the surface.

The substrate 20 is two-piece. It has a support 34, in which fluid lines are made in the form of boreholes 36 and/or groovelike channels 38 on the lower side, i.e., the side away from the microvalve. The substrate 20, moreover, has on its lower side a cover film 42, by which the fluid lines 36, 38 of the lower side of the substrate are closed. The boreholes 36 open the channels 38 through the support 34 upward to the valve.

The elastomer seal has, for an optionally adjustable fluidic connection of two or more boreholes 36 and fluid lines 38, one or more channels. The channels are fashioned either as a through opening 40, passing entirely through the elastomer seal 16, see FIG. 3. In this case, the elastomer seal 16 can be made as a stamped part and the channels 40 are punched out. In another embodiment, the channels are groovelike depressions 40' worked into the elastomer seal 16' from the side of the sealing surface 18', see FIGS. 4 and 5.

Figure 4:
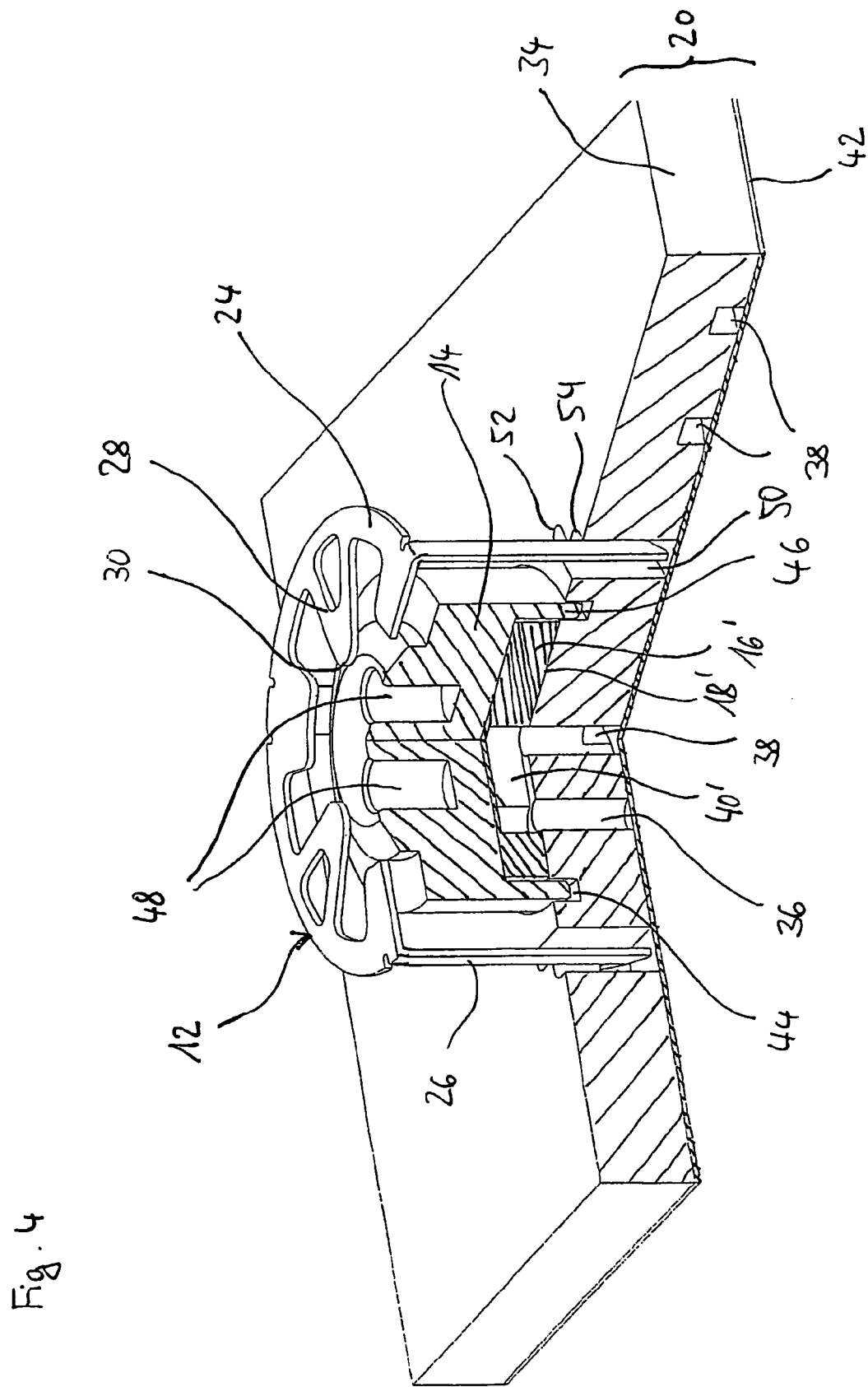
FIG. 4, the sample processing chip with microvalve per FIG. 2 in perspective partial section, and FIG. 5, the sample processing chip with microvalve per FIG. 2 in another perspective and FIG. 6, a sectional view through a sample processing chip with a second embodiment of the invented microvalve.
Figure 5:
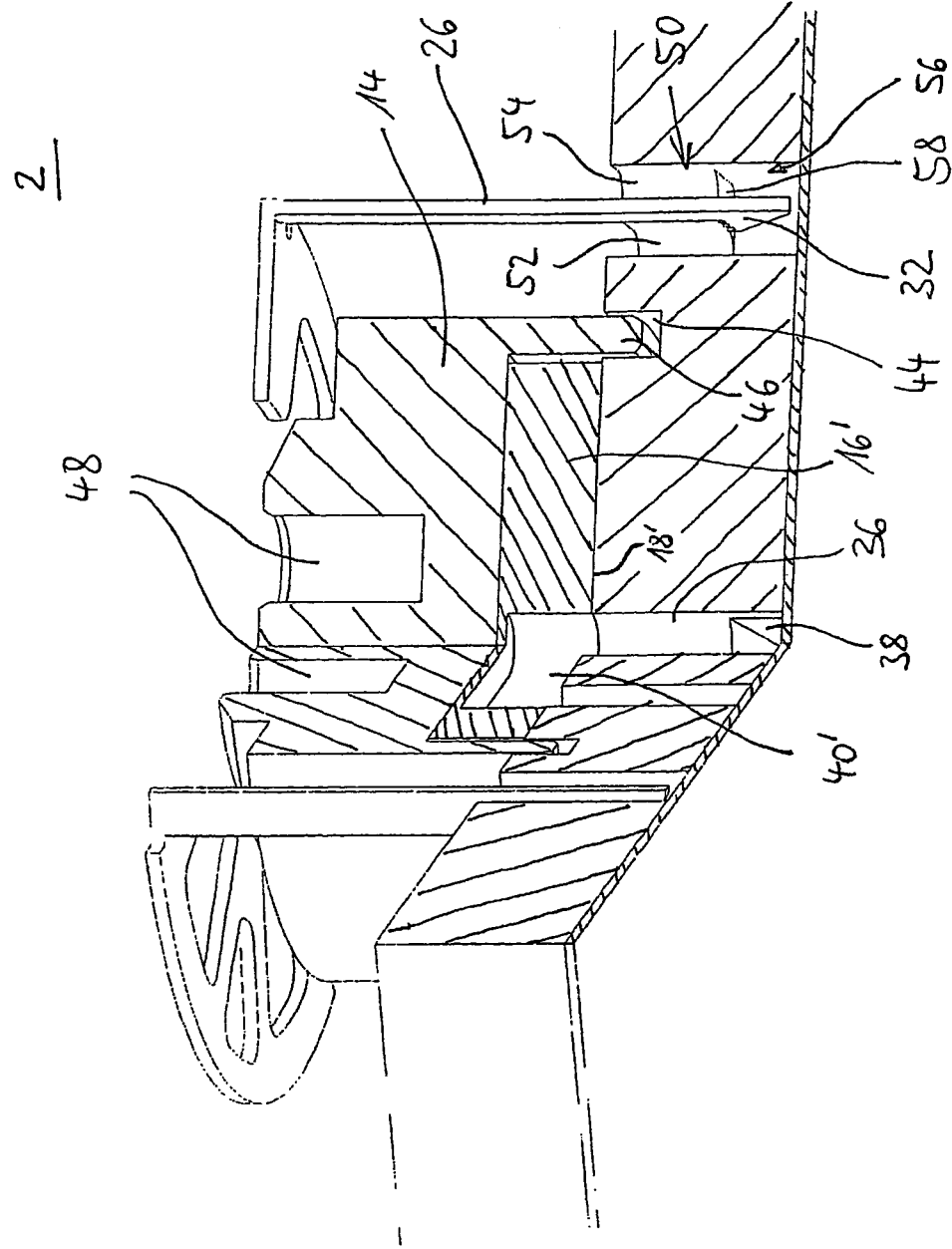

On the top side of the support 34 is provided an annular groove 44 surrounding the sealing surface 22. As can be seen in FIGS. 4 and 5, the shape-stable part 14 of the valve body 10 has a coaxial, cylindrical hollow on its lower side to accommodate the elastomer seal 16, 16'. This hollow is deeper than the thickness of the elastomer seal, so that a ring-shaped edge 46 of the shape-stable part 14 sticks out axially above the sealing surface 18 of the elastomer seal 16. The edge 46 engages with the annular groove 44 in the substrate 20 and acts together with the annular groove 44 as a rotary guide for the microvalve 2.

To activate the rotary valve 2, this has a manipulating element in the form of two cylinder boreholes 48 on its top side. Instead of two boreholes, a slot or some other recess or a projecting shoulder can be provided, with which a complementary tool can engage in form-fitting manner to activate the valve.

In the support 34 of the substrate 20, three installation openings 50 are made on a circle with a 120° partition for the form-fitting connection to the anchor elements 26 of the clamping element 12. The installation openings 50 each have the shape on the top side of a staggered oblong hole with a radially inward lying segment 52, long in the tangential direction, and a radially outward lying segment 54, short in the tangential direction. The direction indications are each referred to the axis of rotation of the valve. The long segment 52 serves to guide the arrow-shaped pawl 32 on the anchor element 26, the short segment 54 serves to receive the anchor elements 26 in the area of their narrower leg above the arrow-shaped pawls 32. From the lower side, the installation openings 50 have a hollow 56 with greater width in the radial direction. In this way, a shoulder 58 is formed in the installation opening.

The diameter of the partial circle on which the long segments 52 of the installation openings 50 are situated is smaller than the diameter of the partial circle on which the anchor elements 26 are arranged. For this reason, the anchor elements 26 must be radially tensioned inwards during the assembly, in order to be threaded into the long segments 52 of the installation openings 50 with the pawls 32. When the clamping element 12 is then lowered until the bending elements press the valve body 10 against the substrate 20 in the desired degree, the axial end position of the clamping element 12 is achieved, in which the pawls 32 snap radially outwards and engage the shoulders 58 in form-fitting manner, so that a pulling of the anchor elements out from the openings 34 is prevented. Thanks to the hollow 56, the arrow-shaped pawls 32 after being installed do not stick out from the substrate 20 at the lower side.

Figure 6:
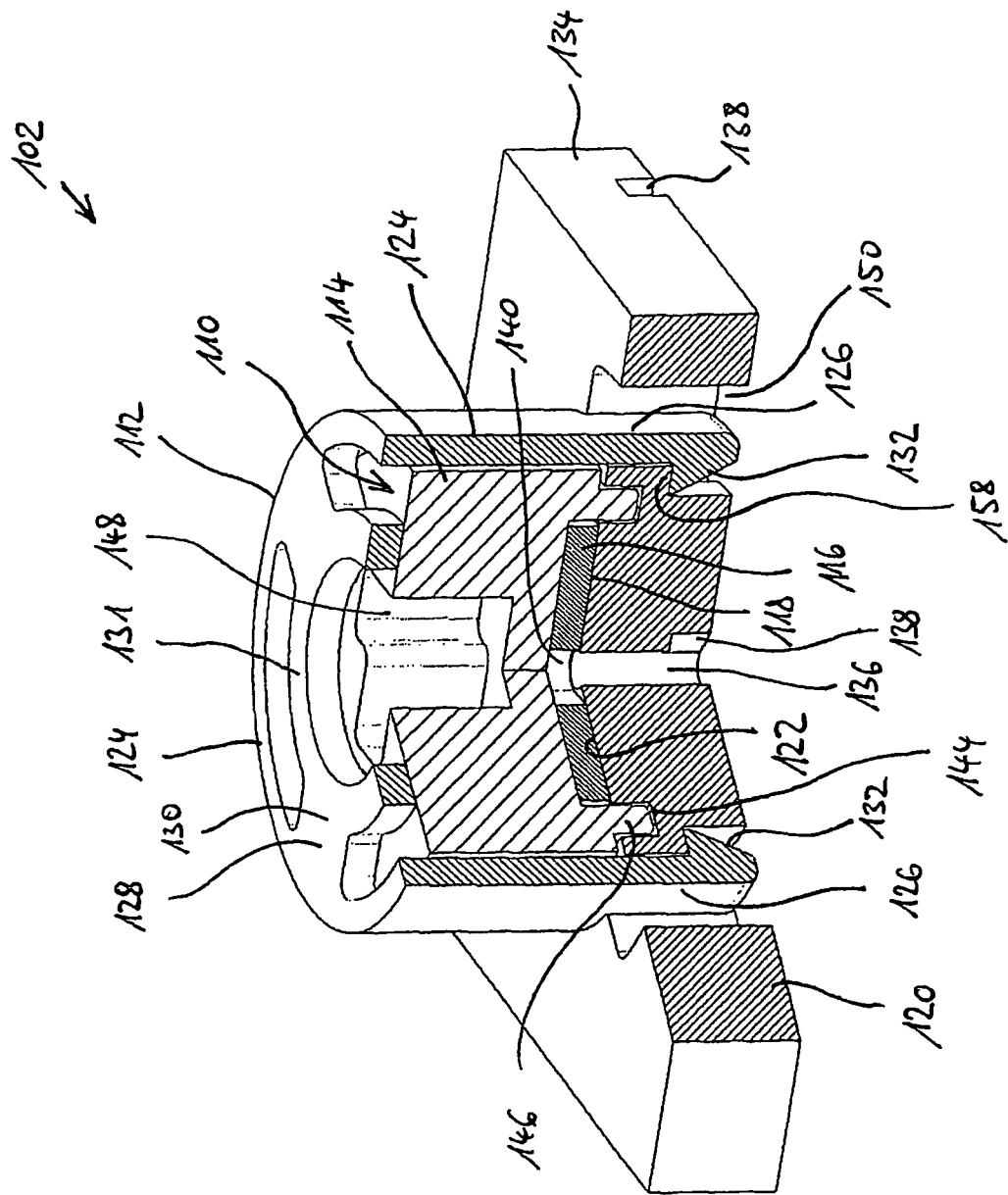

Another embodiment of the invented microvalve is shown in FIG. 6. The microvalve, again, is fashioned as a rotary valve 102 with an essentially cylindrical valve body 110 and a clamping element 112 to support it. The valve body 110 consists of a shape-stable part 114 and an elastomer seal 116, on whose lower side a sealing surface 118 is formed, lying on a corresponding sealing surface 122 of the substrate 120. The substrate 120 is likewise two-piece, but only the support 134 is shown in FIG. 6. In the support 134, fluid lines are made in the form of boreholes 136 and/or groovelike channels 138 on the lower side, i.e., the side away from the microvalve. The boreholes 136 open the channels 138 through the support 134 upward to the valve.

The elastomer seal 116 has, for optionally adjustable fluidic connection of two or more boreholes 136 or fluid lines 138, one or more channels in the form of a through opening 140.

On the top side of the support 134 is once again provided an annular groove 144 surrounding the sealing surface 122, with which the ring-shaped edge 146 of the shape-stable part 114 engages to form a rotary guide.

The manipulation element for activation of the rotary valve 102 in this embodiment has the shape of a polygonal inner profile 148.

The microvalve in the embodiment of FIG. 6 differs from the previously described one mainly in that an injection-molded plastic part is used as the clamping element 112. The clamping element 112, like the clamping element 12, is a single piece. It has a cylindrical housing segment 124 with several, preferably three, elastic bending elements 128, pointing radially inwards on its top side. The bending elements 128 are connected at their radially inner end 130 to an annular segment 131 for stabilization and adjustment of the elasticity-related pressing force. By this em annular segment 131, the clamping element 112 lies on the top side of the shape-stable part 114 of the valve body 110. The spring force by which the bending elements 128 press the valve body 110 against the substrate 120 is once again dictated by the geometry of the clamping element 112 for a given base material (plastic or plastic extrusion-coated spring steel plate).

The housing segment 124 has the shape of a hollow cylinder, which encloses the valve cylinder 110 and sits on the top side of the substrate 120. Several, preferably three, anchor elements 126 emerge downward in the axial direction from the cylinder wall of the housing segment 124. The anchor elements 126 each have at their free end a pawl or a snap hook 132 for form-fitting connection to the sample processing chip 120. In the support 134 of the substrate 120 there are three installation openings 150 arranged on a circle with a 120° division. The installation openings 150 have an undercut 158 pointing radially inward from the lower side of the support 134. The clamping element 112 and the installation openings 150 are shaped or dimensioned so that the anchor elements 126 move radially inwards by virtue of the elasticity of the material when the snap hooks 132 are introduced into the corresponding installation openings 150 and become tensioned in this way. When the clamping element 112 is further lowered until the bending elements 128 press the valve body 110 against the substrate 120 in the desired degree, the axial end position of the clamping element 112 is reached, in which the snap hooks 132 snap radially inward and thereby engage in form-fitting manner with the undercuts 158, so that a pulling of the anchor elements 126 out from the openings 150 is prevented.

The height of the anchor elements 126 is designed as a function of the thickness of the substrate 120 or the height of the undercut 158 so that the bending elements 128 are tensioned to the desired degree and press the valve body 110 against the substrate 120 when the valve is mounted on the substrate 120.

As regards the providing of the pressing force, all sample embodiments shown are identical in that the elasticity is provided by the valve body and more precisely by the elastomer seal on the one hand and by the clamping element and more precisely by the bending elements on the other hand. The shape-stable part of the valve body is rigid enough to distribute the pressing force uniformly over the elastomer seal.

As a departure from this, it is possible and also preferred from the aspect of the invention having a sealing device with a sealing element, to configure the valve body or the sealing element as a single-piece element. In the form of a septum, the sealing element can be fully elastic, thereby ensuring that it has sufficient stability on its own to fulfill the desired sealing function. For example, in the form of a ceramic filter, the sealing element is inelastic. In this case, the required elasticity to generate a sufficient pressing force comes solely from the clamping element. The same holds in principle for the valve body as well.

The shape-stable part and the elastomer seal can basically be joined by form-fit; friction connection, and intimate material connection. As already mentioned, both parts of the valve body are produced in a joint two-component injection molding. Alternatively, they can be produced separately and glued together. In departure from the sample embodiments depicted, a form fit can also be achieved by dogs in the form of projections on the shape-stable part, which engage with corresponding recesses in the elastomer seal or vice versa.

LIST OF REFERENCE NUMBERS

2 Rotary valve
10 Valve body
12 Clamping element
14 Shape-stable part
16,16' Elastomer seal
18,18' Sealing surface of elastomer seal
20 Sample processing chip/substrate
22 Sealing surface of substrate
24 Annular segment
26 Anchor element
28 Bending element
30 Corner of bending element
32 Pawl
34 Support
36 Fluid line, borehole
38 Fluid line, groovelike channel
40,40' Channel
42 Cover film
44 Annular groove
46 Ring-shaped edge
48 Cylinder borehole
50 Installation opening
52 Long segment 54 Short segment
56 Hollow
58 Shoulder
102 Rotary valve
110 Valve body
112 Clamping element
114 Shape-stable part
116 Elastomer seal
118 Sealing surface of elastomer seal
120 Sample processing chip/substrate
122 Sealing surface of substrate
124 Cylindrical housing segment
126 Anchor element
128 Bending element
130 Inner end of bending element
131 Annular segment
132 Pawl, snap hook
134 Support
136 Fluid line, borehole
138 Fluid line, groovelike channel
140 Channel
144 Annular groove
146 Ring-shaped edge
148 Profile
150 Installation opening
158 Undercut
210 Substrate
212 Valve body
214 Sealing surface
216 Contact or sealing surface
218 Valve cylinder
220 Compression spring
222 Housing
224 Screw connection

The invention claimed is:

1. A sample processing chip with a microvalve for control of fluid streams therein, the sample processing chip comprising: a substrate, the substrate forming a sealing surface of the microvalve, and a valve body disposed movably relative to the substrate, which has a sealing surface and defines at least one channel for optional connection and/or separation of fluid lines in the substrate, wherein the sealing surface of the valve body and the sealing surface of the substrate lie against each other in a fluid-tight manner, wherein the valve body is pressed by its sealing surface against the sealing surface of the substrate by a clamping element directly connected to the substrate in form-fitting manner and the clamping element is a flexural-elastic single piece element.

2. The microvalve sample processing chip according to claim 1, wherein the valve body or the sealing element is compressive-elastic.

3. The sample processing chip according to claim 2, wherein the valve body or the sealing element consists at least partly of an elastomer.

4. The sample processing chip according to claim 3, wherein the valve body has a shape-stable part and an elastomer seal, on which the sealing surface is formed, whereby a pressing force from the clamping element acts across the shape-stable part on the elastomer seal.

5. The sample processing chip according to claim 4, wherein the shape-stable part together with the elastomer seal is produced by two-component injection molding.

6. The sample processing chip according to claim 4, wherein the at least one channel in the elastomer seal is formed as a through opening.

7. The sample processing chip according to claim 1, wherein the clamping element consists of spring steel.

8. The sample processing chip according to claim 1, wherein the clamping element and the substrate engage with each other by a snap connection.

9. A sample processing chip with a microvalve for control of fluid streams therein, the sample processing chip comprising: a substrate, the substrate forming a sealing surface of the microvalve, and a valve body disposed movably relative to the substrate, which has a sealing surface and defines at least one channel for optional connection and/or separation of fluid ones in the substrate, wherein the sealing surface of the valve body and the sealing surface of the substrate lie against each other in a fluid-tight manner,
wherein the valve body is pressed by its sealing surface against the sealing surface of the substrate by a clamping element directly connected to the substrate in form-fitting manner and the clamping element is a flexural-elastic single element, and
wherein the clamping element and the substrate engage with each other directly by a snap connection.

10. A sample processing chip with a microvalve for control of fluid streams therein, the sample processing chip comprising: a substrate, the substrate forming a sealing surface of the microvalve, and a valve body disposed movably relative to the substrate, which has a sealing surface and defines at least one channel for optional connection and/or separation of fluid lines in the substrate, wherein the sealing surface of the valve body and the sealing surface of the substrate lie against each other in a fluid-tight manner,
wherein the valve body is pressed by its sealing surface against the sealing surface of the substrate by a clamping element directly connected to the substrate in form-fitting manner and the clamping element is a flexural-elastic single piece element, and
wherein the clamping element and the substrate engage with each other directly by a snap connection, and wherein the clamping element comprises an annular segment with several elastic bending elements pointing radially inwards and resting against a top side of the valve body.

11. A method for production of a sample processing chip with a microvalve in a microfluidics system, comprising the steps of:
placing a valve body with a sealing surface on a sealing surface of a substrate, pressing the valve body by a clamping element by its sealing surface fluid-tight directly against the sealing surface of the substrate, and connecting the clamping element by form-fitting directly to the substrate wherein the valve body is disposed movably relative to the substrate, which defines at least one channel for optional connection and/or separation of fluid lines in the substrate, and wherein the clamping element is a flexural-elastic single piece element.

* * * * *

UNITED STATES PATENT AND TRADEMARK OFFICE
CERTIFICATE OF CORRECTION

| | |
|---|---|
| PATENT NO. | : 8,911,688 B2 |
| APPLICATION NO. | : 12/737278 |
| DATED | : December 16, 2014 |
| INVENTOR(S) | : Rainer Gransee et al. |

It is certified that error appears in the above-identified patent and that said Letters Patent is hereby corrected as shown below:

In The Claims

In claim 9, column 10, line 16, replace the word "ones" with --lines--.

Signed and Sealed this
Thirty-first Day of March, 2015

Michelle K. Lee
*Director of the United States Patent and Trademark Office*